United States Patent
Sahota et al.

(10) Patent No.: US 7,765,588 B2
(45) Date of Patent: *Jul. 27, 2010

(54) SYSTEM AND METHOD FOR IDENTITY VERIFICATION

(76) Inventors: Harvinder Sahota, 3861 Wisteria, Seal Beach, CA (US) 90740; Neil Sahota, 136 Oxford St., Irvine, CA (US) 92612

(*) Notice: Subject to any disclaimer, the term of this patent is extended or adjusted under 35 U.S.C. 154(b) by 3 days.

This patent is subject to a terminal disclaimer.

(21) Appl. No.: 12/272,708

(22) Filed: Nov. 17, 2008

(65) Prior Publication Data

US 2009/0077646 A1    Mar. 19, 2009

Related U.S. Application Data

(63) Continuation of application No. 10/193,476, filed on Jul. 9, 2002, now Pat. No. 7,454,784.

(51) Int. Cl.
*G06F 7/04* (2006.01)
*G06F 12/14* (2006.01)
*H04L 29/06* (2006.01)
*H04L 9/32* (2006.01)
*G06F 21/00* (2006.01)
*G06Q 20/00* (2006.01)

(52) U.S. Cl. .................. 726/9; 726/20; 726/30; 713/159; 713/162; 713/168; 713/172; 713/185; 713/190; 705/55; 705/56; 705/64; 705/67; 705/73

(58) Field of Classification Search .......... 726/9, 726/20, 30; 713/159, 162, 168, 172, 185, 713/190; 705/55, 56, 64, 67, 73
See application file for complete search history.

(56) References Cited

U.S. PATENT DOCUMENTS

| | | | | |
|---|---|---|---|---|
| 5,473,692 A | * | 12/1995 | Davis | .......................... 705/59 |
| 5,550,561 A | | 8/1996 | Ziamo | |
| 5,742,845 A | | 4/1998 | Wagner | |
| 5,978,476 A | * | 11/1999 | Redman et al. | ................ 705/51 |
| 5,997,924 A | | 12/1999 | Olander, Jr. et al. | |
| 6,055,592 A | | 4/2000 | Smith | |
| 6,056,193 A | | 5/2000 | McAuliffe et al. | |
| 6,319,125 B1 | | 11/2001 | Acres | |
| 6,401,205 B1 | * | 6/2002 | Rallis et al. | .................. 713/172 |

(Continued)

*Primary Examiner*—Aravind K Moorthy
(74) *Attorney, Agent, or Firm*—Knobbe Martens Olson & Bear LLP (57) ABSTRACT

A system and method verify a user's identity in an Internet-related transaction. One system and method use a personal computer having identification information, a card reader, and a personal identification card having access information, to verify a user's identity using the access information and the identification information. Another system and method use a personal computer, a card reader, and a personal identification card having access information, wherein the card reader is included as part of a mouse coupled to the personal computer and wherein a user's identity is verified using the access information. Another system and method use a personal computer, a device coupled to the personal computer having identification information, a card reader, and a personal identification card having access information to verify a user's identity using the access information and the identification information. Another system and method use a personal computer, a fingerprint reader, a card reader, and a personal identification card having access information to verify a user's identity using the access information and the data of the fingerprint reader.

5 Claims, 7 Drawing Sheets

U.S. PATENT DOCUMENTS

| | | |
|---|---|---|
| 6,457,640 B2 | 10/2002 | Ramachandran et al. |
| 6,847,948 B1 | 1/2005 | Paolini et al. |
| 7,035,442 B2 | 4/2006 | Ha et al. |
| 7,454,784 B2 * | 11/2008 | Sahota et al. .................. 726/9 |
| 2002/0055848 A1 | 5/2002 | Jae et al. |
| 2002/0078394 A1 * | 6/2002 | King ............................ 714/2 |
| 2002/0087857 A1 * | 7/2002 | Tsao et al. ................. 713/155 |
| 2002/0120855 A1 * | 8/2002 | Wiley et al. ................. 713/189 |
| 2002/0123972 A1 | 9/2002 | Hodgson et al. |
| 2002/0147922 A1 * | 10/2002 | Hartinger et al. ........... 713/200 |
| 2002/0158824 A1 * | 10/2002 | Janssen ....................... 345/87 |
| 2002/0180584 A1 | 12/2002 | McGregor et al. |
| 2003/0118188 A1 * | 6/2003 | Collier et al. ............... 380/277 |
| 2003/0206542 A1 * | 11/2003 | Holder ....................... 370/338 |
| 2004/0153649 A1 | 8/2004 | Rhoads et al. |

* cited by examiner

SYSTEM AND METHOD FOR IDENTITY VERIFICATION

REFERENCE TO DISCLOSURE DOCUMENT

This application is a continuation of U.S. application Ser. No. 10/193,476, filed on Jul. 9, 2002, U.S. Pat. No. 7,454,784 and entitled "SYSTEM AND METHOD FOR IDENTITY VERIFICATION," which is incorporated herein by reference in its entirety.

BACKGROUND OF THE INVENTION

1. Field of the Invention

The present invention relates generally to identity verification, and, more particularly, relates to identity verification in Internet-related personal computer transactions.

2. Description of the Related Art

Persons and businesses use the Internet to facilitate transactions. While many of these transactions are between honest parties, some persons fraudulently use personal computers and the Internet to obtain goods, services, or both goods and services (hereinafter "products") without payment, and to induce payment from others for products that were never provided. Additionally, some unauthorized persons access and use services provided via the Internet that were intended for a specific audience or that require fees for access.

As used herein, a "personal computer" is a computer designed for an individual user, such as those used in homes and in businesses (e.g., IBM PC Compatibles, Apple Macintosh, etc.).

In a typical purchase transaction, a buyer seeks to purchase products from a provider of products. The provider establishes a web site that the buyer may use to make a purchase. To make the purchase, the buyer uses the buyer's computer keyboard to enter the buyer's personal information and payment source information into a web page of the provider's web site. The buyer's personal information may comprise such things as the buyer's name, residential address, shipping address, telephone number, fax number, and email address. The payment source information may comprise a bank account number, a credit card number, and other identification information suitable for identifying a source for payment. Upon receipt of the buyer's personal information and payment information, the web site initiates a suitable verification process that uses the buyer's personal and payment source information. The verification process is intended to determine whether the buyer is fraudulently representing his or her identity. If the verification process determines that the buyer is not fraudulently representing his or her identity, the provider will obtain payment and provide the products, either by shipping the tangible products, by providing access to services via the Internet, or by other means (e.g., establishing travel reservations, or the like). This verification process has drawbacks. A thief seeking to perpetrate a fraud may circumvent the verification process by obtaining a third-party's personal and payment source information. Upon obtaining this information, the thief may enter the third-party's personal and payment source information into the provider's web site's web page. After the verification process incorrectly determines that the thief is not fraudulently representing his or her identity, the provider will obtain payment from the third-party and provide the products to the thief.

In another transaction, an Internet intermediary web site acts as an intermediary between a buyer and a seller. In a typical situation, a seller uses the seller's computer keyboard to enter the product description, the seller's personal information, and payment destination information into a web page of the intermediary's web site. The seller's personal information may comprise such things as the seller's name, residential address, shipping address, telephone number, fax number, and email address. The payment destination information may comprise a bank account number, a credit card number, name and mailing address, and other identification information suitable for identifying a destination for payment. The intermediary's web site then allows potential buyers to browse the product descriptions that have been posted by the sellers.

When a buyer wants to purchase the products, the intermediary's web site facilitates the sale. This process has drawbacks. A thief seeking to perpetrate a fraud enters false information as his or her seller's personal information or payment destination information. With this false identity, the thief may enter a product description. That description may induce a buyer to send a payment. The thief obtains the payment, but never provides the products.

In another situation, a thief wanting to perpetrate a fraud obtains and uses a third-party's personal information, payment destination information, or both a third-party's personal information and payment destination information. With this false identity, the thief obtains payment from the buyer, but the thief never provides the products.

In another transaction, a service provider provides services via the Internet. In a typical situation, a user registers with the service provider's web site. To register, the user enters the user's personal information, and obtains a password and user name. The user's personal information comprises such things as the user's name, birth date, age, gender, residential address, mailing address, telephone number, fax number, and email address. The user obtains a password and user name, either by choosing his or her own password and user name or by receiving a password and user name from the service provider. The user obtains use of the service provider's web site via entry of the user name and password using the user's keyboard. This process has drawbacks. A thief wanting to obtain use of the service provider's web site need only obtain a third-party's user name and password to access the service provider's web site. Not only is the thief an unauthorized user, but the third-party may be billed for the service that the third party did not request or access.

SUMMARY OF THE INVENTION

An aspect of a preferred embodiment of the invention is a system for verification of a user's identity in a transaction performed using a personal computer connected to the Internet. The system comprises a personal computer connectable to the Internet. The personal computer has identification information unique to the personal computer. A card reader is coupled to the personal computer to communicate data to the personal computer. A personal identification card has access information stored thereon. The card is engageable with the card reader to transfer the access information from the card to the personal computer via the card reader. The access information from the card is combined with the identification information unique to the personal computer to selectively provide access to at least one web site on the Internet only when the access information from the card and the unique identification information of the personal computer correspond to at least one known combination of access information and identification information having authorized access to the web site. Another aspect of this preferred embodiment further provides that the card reader is included as part of a mouse coupled to the personal computer. Yet another aspect of this preferred embodiment further provides that the identification information unique to the personal computer is based on at least one media access control number of at least one hardware device installed in the personal computer.

An aspect of another preferred embodiment of the invention is a system for verification of a user's identity in a transaction performed using a personal computer connected to the Internet. The system comprises a personal computer connectable to the Internet. A dongle is a device that attaches to a computer (e.g., via a parallel port, USB or the like) to control access to a particular application. A dongle has unique identification information and is coupled to the personal computer to communicate the unique identification information to the personal computer. A card reader is coupled to the personal computer to communicate data to the personal computer. A personal identification card has access information stored thereon. The card is engageable with the card reader to transfer the access information from the card to the personal computer via the card reader. The access information from the card is combined with the unique identification information of the dongle to selectively provide access to at least one web site on the Internet only when the access information from the card and the unique identification information of the dongle correspond to at least one known combination of access information and identification information having authorized access to the web site.

An aspect of another preferred embodiment of the invention is a system for verification of a user's identity in a transaction performed using a personal computer connected to the Internet. The system comprises a personal computer connectable to the Internet. A card reader is coupled to the personal computer to communicate data to the personal computer. A fingerprint reader is coupled to the personal computer to communicate data to the personal computer. A personal identification card has access information stored thereon. The card is engageable with the card reader to transfer the access information from the card to the personal computer via the card reader. The access information from the card is combined with data of the fingerprint reader to selectively provide access to at least one web site on the Internet only when the access information from the card and the data of the fingerprint reader correspond to at least one known combination of access information and data of the fingerprint reader having authorized access to the web site.

An aspect of another preferred embodiment of the invention is a method for verification of a user's identity in a transaction performed using a personal computer connected to the Internet. The method comprises receiving access information stored on a personal identification card; receiving data communicated from a fingerprint reader; sending the access information stored on the personal identification card and the data communicated from the fingerprint reader to the web site; generating an access identification value using the access information stored on a personal identification card and the data communicated from the fingerprint reader; determining if the access identification value is one of a set of authorized access identification values; and sending an access reply to a personal computer.

An aspect of another preferred embodiment of the invention is a method for verification of a user's identity in a transaction performed using a personal computer connected to the Internet. The method comprises receiving access information stored on a personal identification card; receiving identification information unique to the personal computer; sending the access information stored on the personal identification card and the identification information unique to the personal computer to the web site; generating an access identification value using the access information stored on a personal identification card and the identification information unique to the personal computer; determining if the access identification value is one of a set of authorized access identification values; and sending an access reply to a personal computer.

An aspect of another preferred embodiment of the invention is a method for verification of a user's identity in a transaction performed using a personal computer connected to the Internet. The method comprises receiving access information stored on a personal identification card; receiving identification information of a dongle; sending the access information stored on the personal identification card and the identification information of the dongle to the web site; generating an access identification value using the access information stored on a personal identification card and the identification information of the dongle; determining if the access identification value is one of a set of authorized access identification values; and sending an access reply to a personal computer.

BRIEF DESCRIPTION OF THE DRAWINGS

The following drawings and the associated description are provided to illustrate specific embodiments of the invention, and not to limit the scope of the invention.

DETAILED DESCRIPTION OF THE PREFERRED EMBODIMENTS

Reference is now made to the drawings wherein the like numbers refer to like aspects throughout.

In the preferred embodiment described herein, a system and associated method facilitate verification of a user's identity in one or more Internet-related personal computer transactions. The one or more Internet-related personal computer transactions may be the same or different transactions.

In particular embodiments, the system and method facilitate verification of a buyer's identity in an Internet-related personal computer purchase transaction. The system and method may also facilitate verification of a seller's identity in an Internet-related personal computer purchase transaction. The system and method may also facilitate verification of a buyer's identity and a seller's identity in an Internet-related personal computer purchase transaction.

In further embodiments, the system and method facilitate verification of a user's identity in an Internet-related personal computer access transaction. The user may access any suitable service that is provided via the Internet, including, but not limited to, web site access, email access, Internet service access, brokerage account access, and personal banking access.

In other embodiments, the system and method facilitate verification of a user's identity in an Internet-related personal computer use transaction after the user has gained access to a particular site. The user may use any suitable service that is provided via the Internet, including, but not limited to, services associated with a web site, services associated with email access, Internet service access, brokerage account access, and personal banking access. For example, the system and method may facilitate verification of a user's identity to execute a purchase or sale of stocks in connection with a brokerage account established on the Internet. The system and method may also determine the scope of the use by permitting a user to use the entire set of, or only a subset of, the services offered.

In particular embodiments, to facilitate verification of a user's identity in an Internet-related personal computer transaction, the system and method obtain one or more forms of physical-based authorization. A physical-based authorization is an authorization obtained from physical sources. Physical-based authorizations may be obtained from any suitable device, including, but not limited to, devices such as a magnetic card reader, a smart card reader, a fingerprint reader, a retina scanner, a voiceprint reader, or a DNA reader. Because such authorizations are obtained from physical sources, it is more difficult for a thief to fraudulently use the system. Physical-based authorizations may be used with one or more items such as any of the personal information described herein, any of the payment information described herein, a personal identification number, the user name and password described herein, or any other suitable information.

Figure 1:
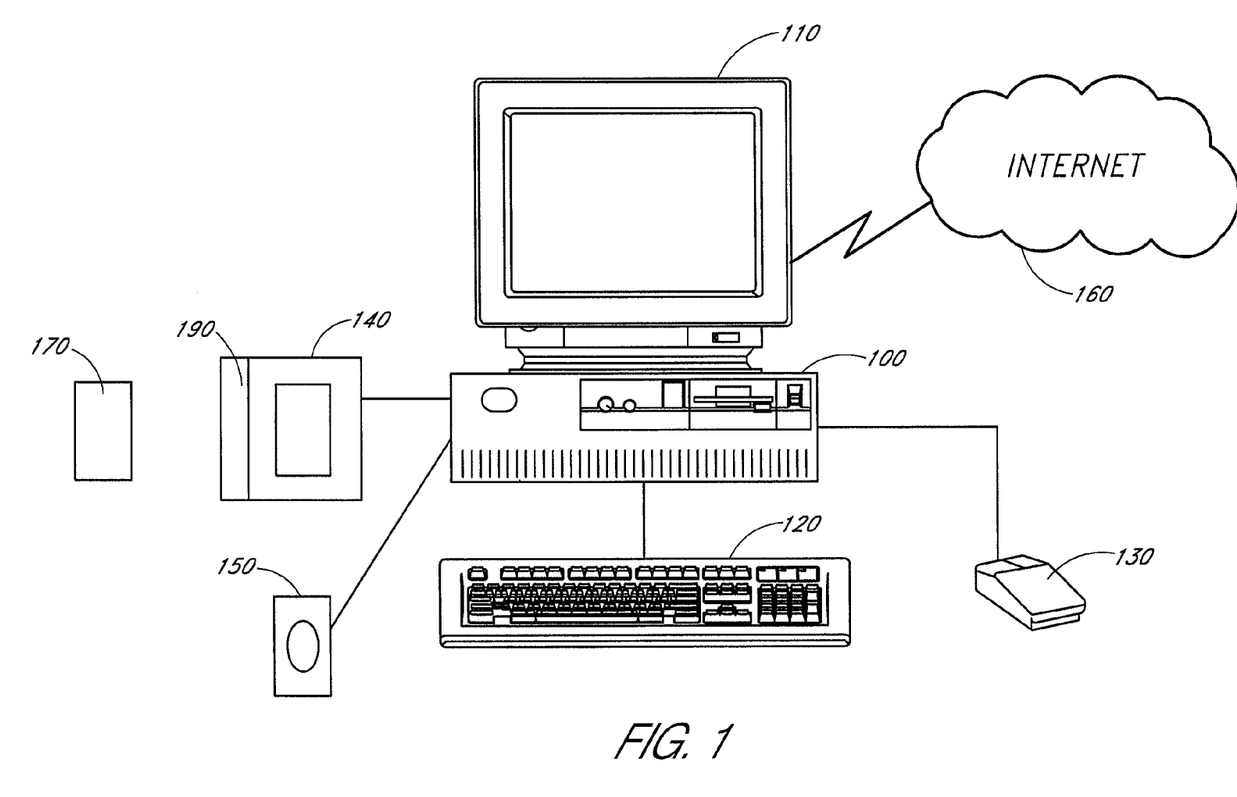
FIG. 1 illustrates an embodiment of the invention wherein a system is used to obtain data from a fingerprint reader and a card reader to verify a user's identity.

In an embodiment illustrated in FIG. 1, a personal computer 100 is coupled to a monitor 110, a keyboard 120, a mouse 130, a card reader 140, a fingerprint reader 150, and the Internet 160. To facilitate verification of a user's identity in an Internet-related personal computer transaction, the personal computer 100 obtains a physical-based authorization from a fingerprint reader 150 and a physical-based authorization from a personal identification device 170 comprising a card, described herein, engageable with the card reader 140 via any suitable alternative, including, but not limited to, a card swipe slot 190. In this embodiment, a web site (not shown) on the Internet 160 combines the access information from the card 170 with data of the fingerprint reader 150 to selectively provide access to the web site only when the access information from the card 170 and the data of the fingerprint reader 150 correspond to at least one known combination of access information and data of the fingerprint reader having authorized access to the web site.

Figure 2:
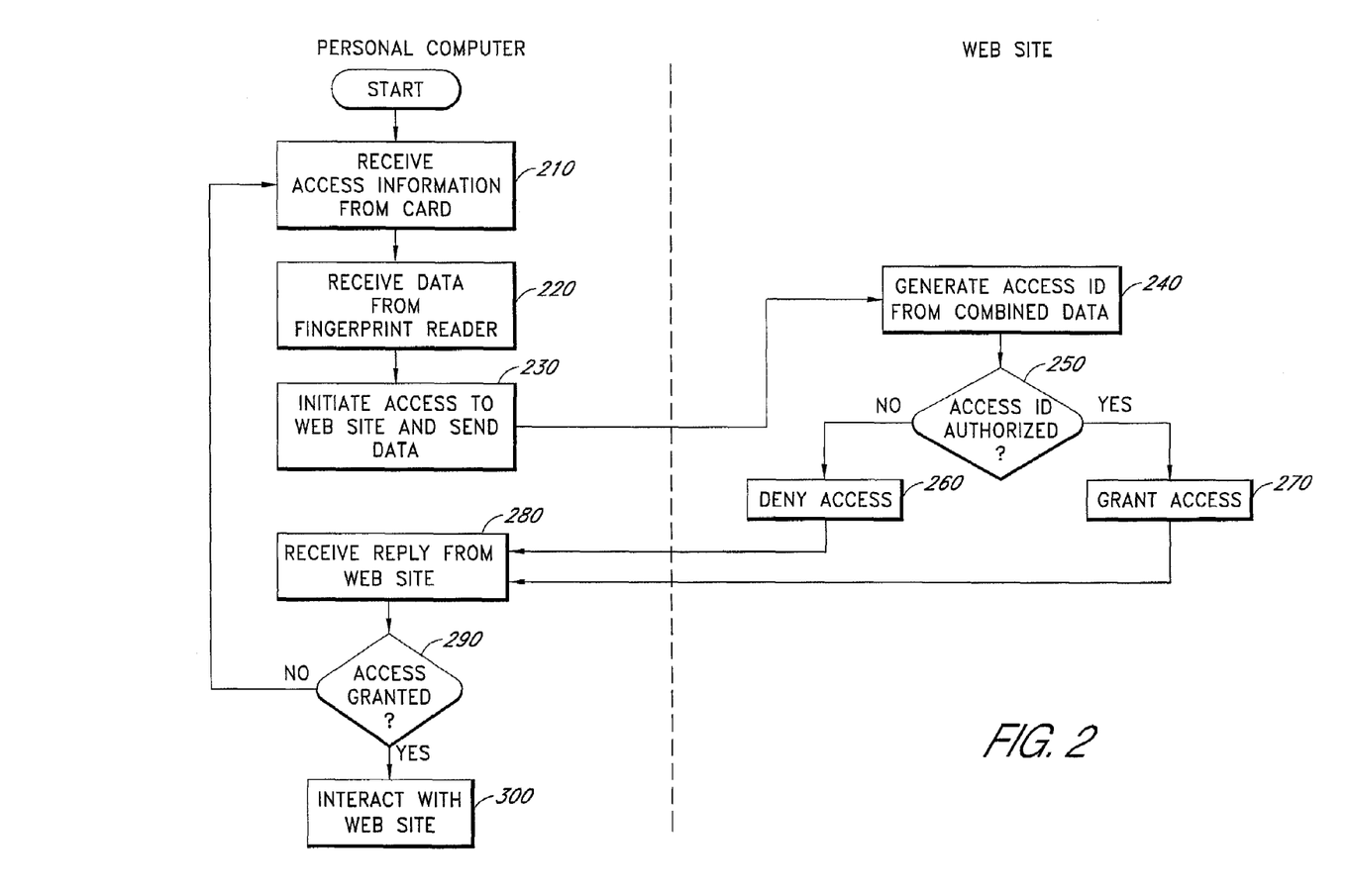
FIG. 2 illustrates an embodiment of the invention wherein a method uses data from a fingerprint reader and a card reader to verify a user's identity.

The system as shown in FIG. 1 operates in accordance with a method shown in FIG. 2 to determine whether the combined access information from the card 170 and the data of the fingerprint reader 150 are sufficient to authorize a requested transaction. At a state 210, the personal computer 100 receives access information from the card 170. At a state 220, the personal computer 100 receives the data of the fingerprint reader 150. At a state 230, the personal computer 100 initiates access to web site and sends the data and information to the web site. At a state 240, the web site generates an access identification value, or access ID, from the combined data. At a state 250, the web site determines if the access ID is one of a set of authorized access IDs. If the access ID is not authorized, the method proceeds to a state 260 wherein the web site sends a reply to the personal computer 100 that access is denied. If the access ID is authorized, the method proceeds to a state 270 wherein the web site sends a reply to the personal computer 100 that access is granted. At a state 280, the personal computer 100 receives the reply from the web site. At a state 290, the personal computer 100 determines if access is granted. If access is not granted, the system may repeat the process beginning at the state 210, may terminate the process (not shown), or may perform other suitable actions (not shown). If access is granted, the method proceeds to a state 300 wherein the personal computer 100 may interact with the web site.

In particular embodiments, the system and method are configured such that a personal identification device may only be used at one or more locations. This configuration may comprise any suitable process, including, but not limited to, accessing one or more devices that are accessible by the system wherein said devices have associated identification information. The associated information comprises any information suitable for identifying a device, and may be implemented in any suitable manner, including, but not limited to, hardware, software, or both hardware and software. For example, software implementations may include such things as an Internet Protocol (IP) address, or a computer name. For example, hardware implementations may include such things as an associated media access control (MAC) number, which uniquely identifies that piece of hardware in a manner known to persons skilled in the art. In another embodiment, hardware implementations may use one or attributes of one or more hardware devices to identify a personal computer. For example, in one embodiment, a personal computer has identification information comprising the attributes of the personal computer's data storage drives, processor, and the like.

Figure 3:
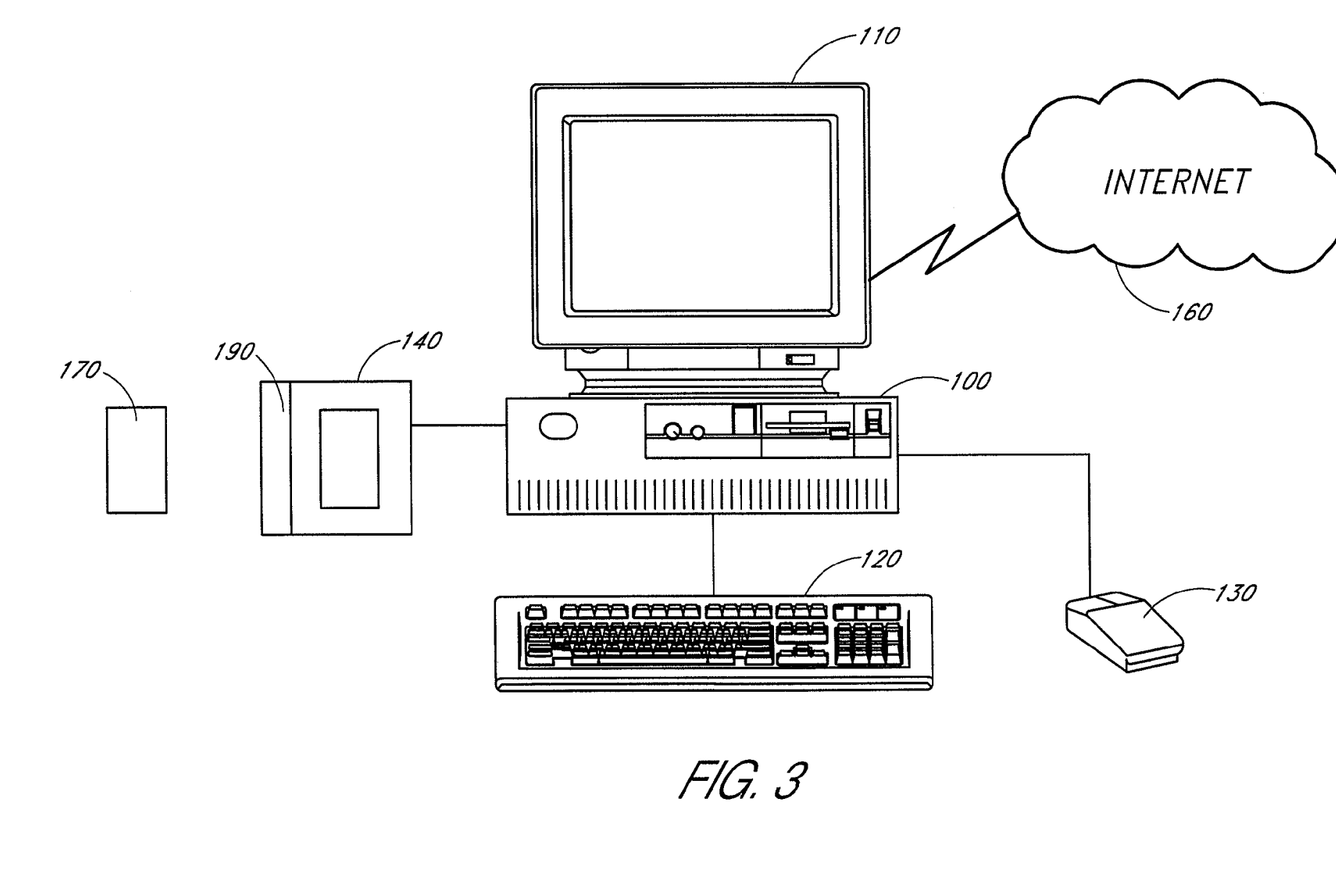
FIG. 3 illustrates an embodiment of the invention wherein a system is used to obtain data from a card reader and a personal computer to verify a user's identity.

FIG. 3 illustrates an embodiment in which the personal identification device is a card, and in which the device that is accessible by the system is a user's personal computer that has associated identification information. The personal computer 100 is coupled to the monitor 110, the keyboard 120, the mouse 130, the card reader 140, and the Internet 160 as described above. The card 170 is engageable with the card reader 140 via the card swipe slot 190. The user's personal computer 100 preferably has identification information unique to the personal computer 100 within its hardware comprising a identifier unique to the personal computer. The system is preferably configured such that the card 170 will only verify a user's identity with a personal computer with that unique identifier (e.g., the MAC number described above). To facilitate verification of a user's identity in an Internet-related personal computer transaction, the personal computer 100 obtains access information from the personal identification card 170 and the identification information unique to the personal computer 100. In this embodiment, a web site (not shown) on the Internet 160 combines the access information from the card 170 with the identification information unique to the personal computer 100 to selectively provide access to the web site only when the access information from the card 170 and the identification information unique to personal computer 100 correspond to at least one known combination of access information and identification information having authorized access to the web site.

Figure 4:
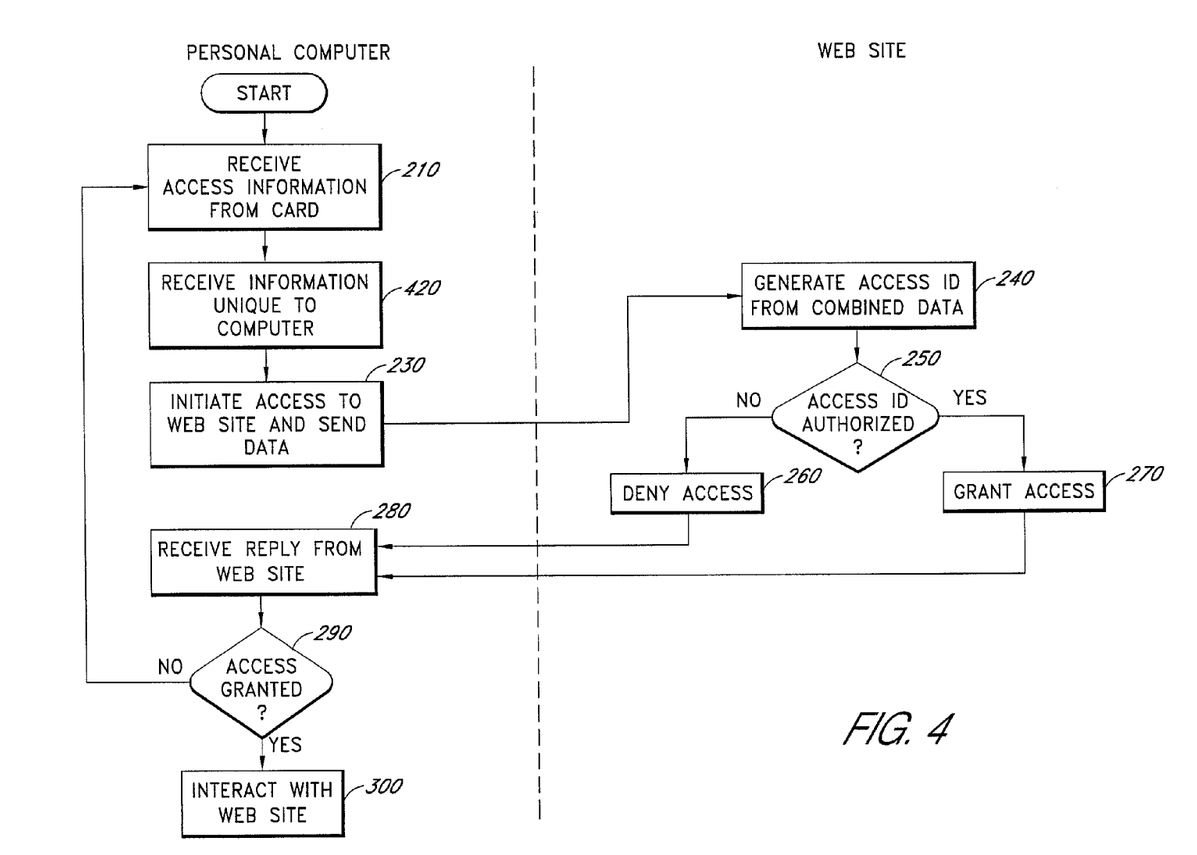
FIG. 4 illustrates an embodiment of the invention wherein a method uses data from a card reader and a personal computer to verify a user's identity.

The system as shown in FIG. 3 operates in accordance with a method shown in FIG. 4 to determine whether the combined access information from the card 170 and the identification information unique to the personal computer 100 are sufficient to authorize a requested transaction. One skilled in the art will recognize that the process described in FIG. 2 applies to other suitable uses as shown in FIG. 4, wherein similar numbers represent similar aspects and the state 220 is replaced with a state 420. At the state 420, the personal computer 100 receives the identification information unique to the personal computer 100. The information from the two sources is transmitted to the web site in the state 230, and the operations in the remaining states are performed as described above in connection with FIG. 2.

In one embodiment, the personal identification device is a card, and the device that is accessible by the system is a device coupled to a user's personal computer. The device coupled to a user's personal computer may be any suitable device, including, but not limited to, a keyboard, a card reader, a mouse, a printer, a scanner, a monitor, and a dongle. A dongle is a device that attaches to a computer (e.g., via a parallel port, USB or the like) to control access to a particular application. The device coupled to a user's personal computer preferably has unique identification information comprising a unique identifier within its hardware. The system is preferably configured such that the card will only verify a user's identity with a personal computer coupled to a device that has that unique identifier. In an embodiment illustrated in FIG. 5, the personal computer 100 is coupled to the monitor 110, the keyboard 120, the mouse 130, the card reader 140, the Internet 160, and a dongle 580 as described above. The card 170 is engageable with the card reader 140 via the card swipe slot 190. The personal identification device is the card 170, and the device that is accessible by the system is the dongle 580. The dongle 580 preferably has unique identification information comprising a unique identifier within its hardware. The system is preferably configured such that the card 170 will only verify a user's identity with a dongle having the unique identifier. To facilitate verification of a user's identity in an Internet-related personal computer transaction, the personal computer 100 obtains access information from the personal identification card 170 and the unique identification information of the dongle 580. In this embodiment, a web site (not shown) on the Internet 160 combines the access information from the card 170 with the unique identification information of the dongle 580 to selectively provide access to the web site only when the access information from the card 170 and the unique identification information of the dongle 580 correspond to at least one known combination of access information and identification information having authorized access to the web site.

Figure 5:
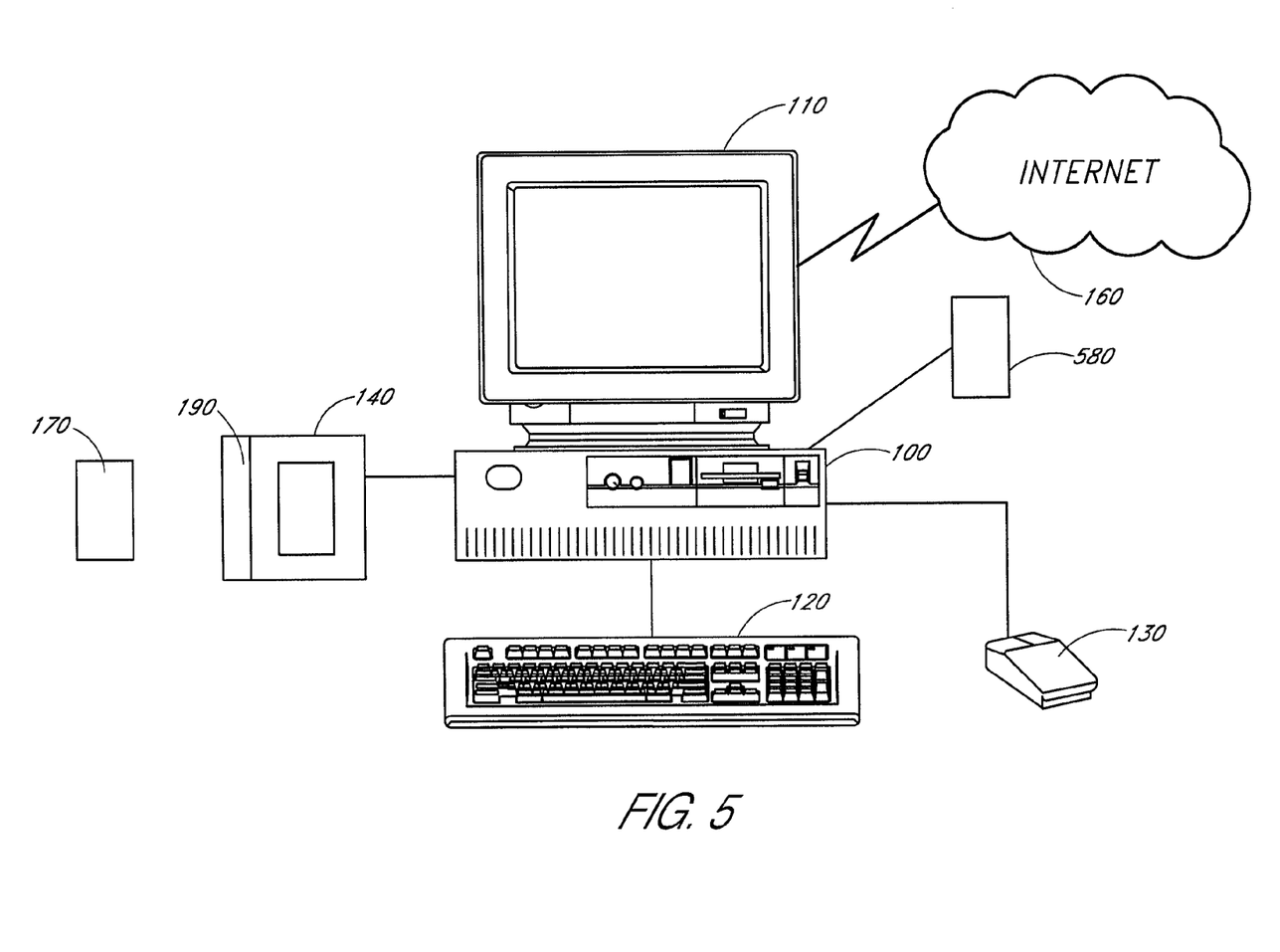
FIG. 5 illustrates an embodiment of the invention wherein a system is used to obtain data from a card reader and a dongle to verify a user's identity.
Figure 6:
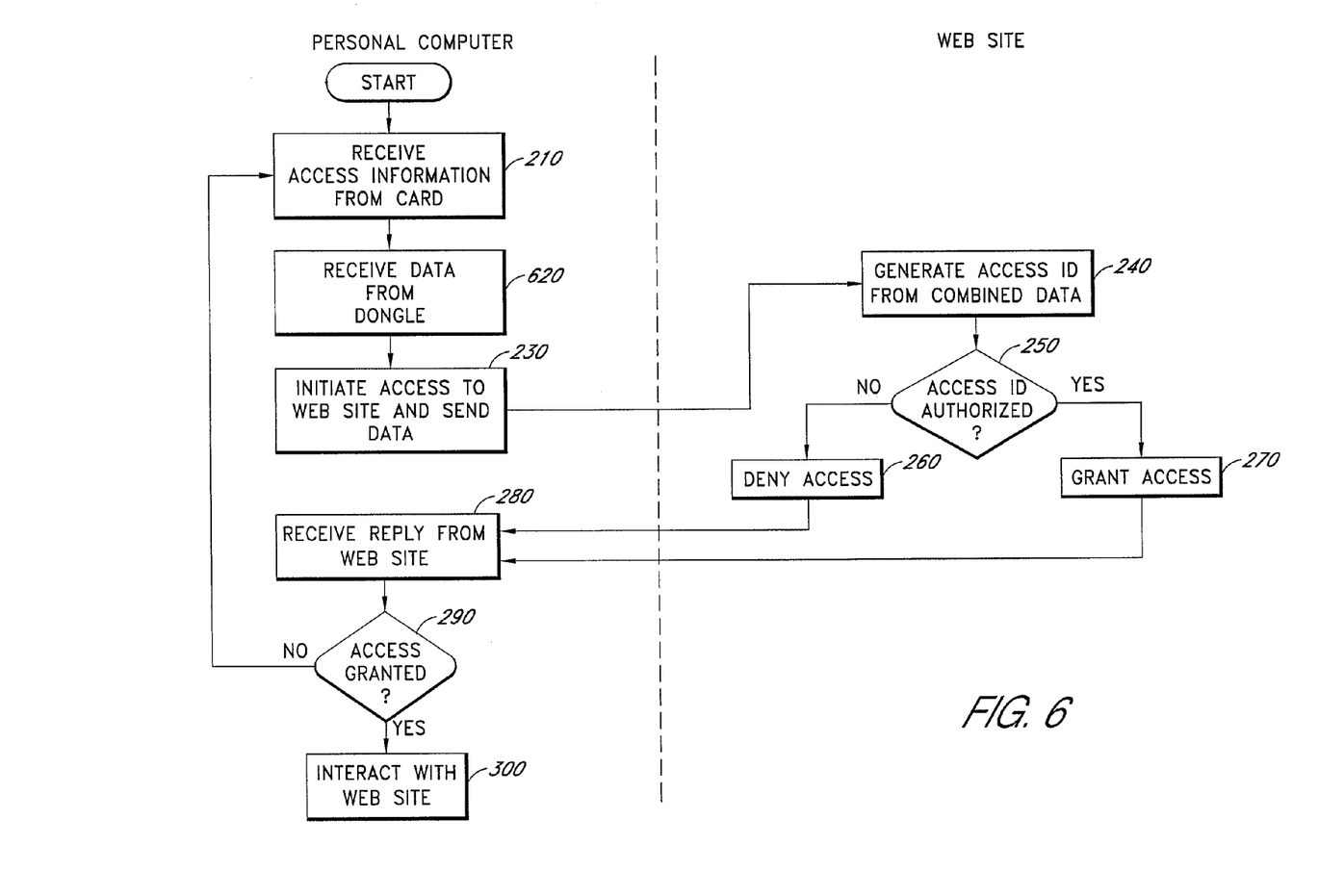
FIG. 6 illustrates an embodiment of the invention wherein a method uses data from a card reader and a dongle to verify a user's identity.

The system as shown in FIG. 5 operates in accordance with a method shown in FIG. 6 to determine whether the combined access information from the card 170 and the unique identification information of the dongle 580 are sufficient to authorize a requested transaction. One skilled in the art will recognize that the process described in FIG. 2 applies to other suitable uses as shown in FIG. 6, wherein similar numbers represent similar aspects and the state 220 is replaced with a state 620. At the state 620, the personal computer 100 receives the unique identification information of the dongle 580. The information from the two sources is transmitted to the web site in the state 230, and the operations in the remaining states are performed as described above in connection with FIG. 2.

In another embodiment, the personal identification device is a card, and the device that is accessible by the system is a card reader. The card reader preferably has a unique identifier within its hardware. The system is preferably configured such that the card will only verify a user's identity with the card reader having the unique identifier.

In other embodiments, the system may be configured such that a personal identification device may be used with one or more devices that are accessible by the system. For example, in one embodiment, a person uses the personal identification device with the user's home personal computers and with the user's work personal computer.

Figure 7:
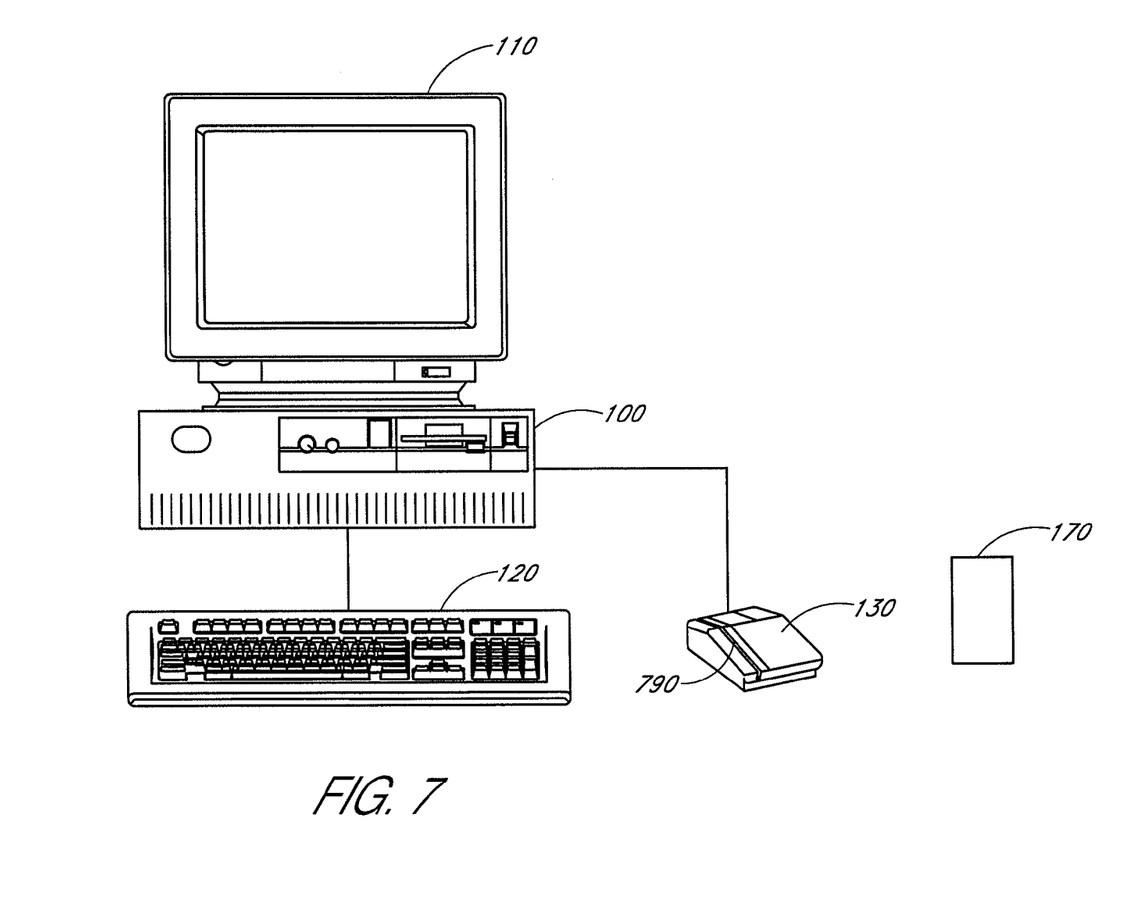
FIG. 7 illustrates an embodiment of the invention wherein a system is used to obtain data from a card reader that is included as part of a mouse to verify a user's identity.

In particular embodiments, a card reader is integrated with an existing device coupled to a user's personal computer. For example, FIG. 7 illustrates an embodiment in which the personal computer 100 is coupled to the monitor 110, the keyboard 120, and a mouse 730. The personal identification card 170 is engageable with the mouse 730 via any suitable alternative, including, but not limited to, a card swipe slot 790. The device coupled to a user's personal computer may be any suitable device, including, but not limited to, a keyboard, a card reader, a mouse, a printer, a scanner, and a monitor.

In particular embodiments, verification of a user's identity may be performed on one or more suitable computers including, but not limited to, the personal computer, a web server that hosts the web site, a suitable computer coupled to the Internet, or a suitable computer coupled to the system. For example, the card reader may be connected to the local computer, which queries a payment authorization center associated with the provider of the card, wherein an authorization is sent from the payment authorization center to the web site. The system can be connected via Internet, phone, cable, network, or any other suitable system. The transmission of the information within the system may be done through an operating system or any other suitable method.

In particular embodiments, the system and method may use any suitable personal identification device that uniquely identifies a person, including, but not limited to, a card having access information stored thereon. The system and method may use a multi-purpose card that facilitates verification of a user's identity in an Internet-related personal computer transaction, and has one or more other uses. For example, the other uses may comprise use as a credit card and use as an ATM card. A card may facilitate verification of a user's identity in one or more Internet-related personal computer transactions, which may be the same or different. A business may provide an identification service from which a person can obtain a card, which may, but need not be, associated with a payment source such as bank accounts, credit card accounts, and investment accounts. A business may provide a card for use with the business's services.

Although this invention has been described in terms of certain preferred embodiments, other embodiments that are apparent to those of ordinary skill in the art, including embodiments which do not provide all of the benefits and features set forth herein, are also within the scope of this invention. Accordingly, the scope of the present invention is defined only by reference to the appended claims.

What is claimed is:

1. A system for verification of a user's identity in a transaction performed using a personal computer connected to the Internet, the system comprising:
   a personal computer connectable to the Internet,
   a dongle having unique identification information and coupled to the personal computer to communicate the unique identification information to the personal computer; a card reader coupled to the personal computer to communicate data to the personal computer;
   a personal identification card having access information stored thereon, the card engageable with the card reader to transfer the access information from the card to the personal computer via the card reader, and
   at least one web site on the Internet configured to combine the access information from the card with the unique identification information of the dongle, the web site further configured to provide access to the web site when the access information from the card and the unique identification information of the dongle correspond to at least one known combination of access information and identification information having authorized access to the web site.

2. A system for verification of a user's identity in a transaction performed using a personal computer connected to the Internet, the system comprising:

a personal computer connectable to the Internet;

a card reader coupled to the personal computer to communicate data to the personal computer;

a fingerprint reader coupled to the personal computer to communicate data to the personal computer;

a personal identification card having access information stored thereon, the card engageable with the card reader to transfer the access information from the card to the personal computer via the card reader, and at least one web site on the Internet configured to combine the access information from the card with data of the fingerprint reader, the web site further configured to provide access to the web site when the access information from the card and the data of the fingerprint reader correspond to at least one known combination of access information and data of the fingerprint reader having authorized access to the web site.

3. A method for verification of a user's identity in a transaction performed using a personal computer connected to the Internet, the method comprising:

receiving access information stored on a personal identification card;

receiving data communicated from a fingerprint reader;

sending the access information stored on the personal identification card and the data communicated from the fingerprint reader to a web site on the Internet;

generating an access identification value at the web site by using the access information stored on the personal identification card and the data communicated from the fingerprint reader;

determining at the web site if the access identification value is one of a set of authorized access identification values; and sending an access reply to a personal computer.

4. A method for verification of a user's identity in a transaction performed using a personal computer connected to the Internet, the method comprising:

receiving access information stored on a personal identification card;

receiving identification information associated with the personal computer;

sending the access information stored on the personal identification card and the identification information associated with the personal computer to a web site on the Internet;

generating an access identification value at the web site by using the access information stored on the personal identification card and the identification information associated with the personal computer;

determining at the web site if the access identification value is one of a set of authorized access identification values; and sending an access reply to a personal computer.

5. A method for verification of a user's identity in a transaction performed using a personal computer connected to the Internet, the method comprising:

receiving access information stored on a personal identification card;

receiving identification information of a dongle;

sending the access information stored on the personal identification card and the identification information of the dongle to a web site on the Internet;

generating an access identification value at the web site by using the access information stored on the personal identification card and the identification information of the dongle;

determining at the web site if the access identification value is one of a set of authorized access identification values; and sending an access reply to a personal computer.

* * * * *